DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1211

T892,012

PROCESS FOR MAKING NAPPED SPONGE STRUCTURES

Ronald E. Lovell, Jr., Columbia, Tenn., assignor to E. I. du Pont de Nemours and Company, Wilmington, Del.

Continuation of abandoned application Ser. No. 803,121, Feb. 27, 1969. This application Jan. 4, 1971, Ser. No. 103,838

Int. Cl. B29d; B29h *7/20*

U.S. Cl. 264—49

No Drawing. 10 Pages Specification

Process for making fibrous regenerated cellulose sponge structures having napped surfaces which comprises spraying the surfaces of the extruded or cast viscose-fiber-salt mixture, immediately prior to regeneration, with water droplets.